United States Patent
Dalzin et al.

(10) Patent No.: US 12,497,823 B2
(45) Date of Patent: Dec. 16, 2025

(54) GLAZING WITH RESONATORS

(71) Applicant: SAINT-GOBAIN GLASS FRANCE, Courbevoie (FR)

(72) Inventors: Fabien Dalzin, Compiegne (FR); Jean-Philippe Boure, Ribecourt-Dreslincourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 218 days.

(21) Appl. No.: 18/546,031

(22) PCT Filed: Feb. 11, 2022

(86) PCT No.: PCT/FR2022/050249
§ 371 (c)(1),
(2) Date: Aug. 10, 2023

(87) PCT Pub. No.: WO2022/171963
PCT Pub. Date: Aug. 18, 2022

(65) Prior Publication Data
US 2024/0133227 A1    Apr. 25, 2024

(30) Foreign Application Priority Data
Feb. 12, 2021 (FR) ...................... 2101334

(51) Int. Cl.
*E06B 3/67* (2006.01)
*E06B 3/663* (2006.01)
*E06B 5/20* (2006.01)

(52) U.S. Cl.
CPC ........ *E06B 3/6707* (2013.01); *E06B 3/66309* (2013.01); *E06B 5/205* (2013.01)

(58) Field of Classification Search
CPC ..... E06B 3/6707; E06B 3/66309; E06B 5/205
See application file for complete search history.

(56) References Cited

U.S. PATENT DOCUMENTS 8,006,442 B2 *  8/2011  Cheng ................... E06B 3/6707
                                                   52/786.13
9,493,949 B2 * 11/2016  Yau ....................... G10K 11/172
(Continued)

FOREIGN PATENT DOCUMENTS

CN    110952887 A  *  4/2020
FR    2 907 490 A1     4/2008
(Continued)

OTHER PUBLICATIONS

English translation of FR 2907490, accessed May 16, 2025 via Espacenent.com, <https://translationportal.epo.org/emtp/translate/?ACTION=description-retrieval&COUNTRY=FR&ENGINE=google&FORMAT=docdb&KIND=A1&LOCALE=en_EP&NUMBER=2907490&SRCLANG=fr&TRGLANG=en> (Year: 2008).*

(Continued)

*Primary Examiner* — Jeremy A Luks
(74) *Attorney, Agent, or Firm* — Pillsbury Winthrop Shaw Pittman LLP

(57) ABSTRACT

A glazing includes at least two glazed panels, which form a cavity between them, and at least one stack of resonators positioned in the cavity, wherein the at least one stack of resonators includes at least two resonators of different length, the resonators of the at least one stack having a longitudinal axis and being stacked along a stacking axis perpendicular to their longitudinal axis.

15 Claims, 2 Drawing Sheets

(56) References Cited

U.S. PATENT DOCUMENTS

2005/0136198 A1    6/2005  Bourlier et al.
2010/0300800 A1  12/2010  Leconte et al.

FOREIGN PATENT DOCUMENTS

| FR | 2 922 937 A1 | | 5/2009 | | |
|----|--------------|---|--------|---|---|
| GB | 2031479 A | * | 4/1980 | ............. | E04B 1/803 |
| KR | 101313925 B1 | * | 10/2013 | | |
| KR | 101330462 B1 | * | 11/2013 | | |
| WO | WO 00/75473 A1 | | 12/2000 | | |
| WO | WO-2011128858 A2 | * | 10/2011 | ......... | B60R 13/0815 |

OTHER PUBLICATIONS

JR International Search Report as issued in International Patent Application No. PCT/FR2022/050249, dated Jun. 15, 2022.

* cited by examiner

[Fig. 1]
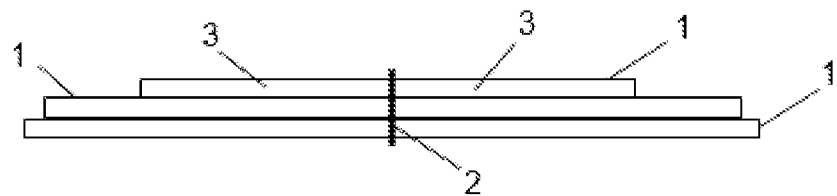
[Fig. 2]

GLAZING WITH RESONATORS

FIELD OF THE INVENTION

The present invention relates to a glazing, in particular for a building, having acoustic insulation properties.

TECHNICAL BACKGROUND

Double glazings consisting of two panes separated by a cavity filled with gas, typically air, are conventionally used in windows and facades of buildings for their thermal and acoustic insulation performance.

However, the loss of transmission of the sound caused by such double glazings decreases for frequencies surrounding the frequency referred to as "mass/spring/mass" corresponding to the resonant frequency of the double glazing and located in the low frequencies. This phenomenon, called the mass/spring/mass effect, is due to significant variations in pressure in the air cavity at the mass/spring/mass frequency.

Different solutions have been developed in order to improve the acoustic insulation performance of the glazings.

Document US 2010/0300800 describes acoustic glazings, in particular aircraft cockpit glazings, comprising a first glass plate separated from a second intermediate glass plate by a layer of acoustic PVB (polyvinyl butyral), the second glass plate being separated from a third glass plate by a layer of standard PVB or of polyurethane.

Document US 2005/0136198 relates to a double glazing comprising two glass panes and, between the two panes, a honeycomb insert with open cells made of polycarbonate.

However, none of these solutions makes it possible to improve acoustic insulation at low frequencies. To improve acoustic insulation at low frequencies, an existing passive solution is to increase the thickness of the glass plates or the thickness of the cavity. However, this leads to bulky and very heavy structures.

Document WO 00/75473 describes a double glazing comprising a waveguide arranged in the periphery of the cavity, along at least one side of the glazing, this waveguide being composed of at least one rectilinear profile provided with a transverse partition positioned according to the acoustic mode that is desired to be disorganized.

However, in such a glazing, the profile, and in particular its dimensions, must be adapted to the particular glazing wherein it is inserted in order to resonate at the resonance frequency of the glazing. Yet manufactured double glazings can have a wide variety of compositions and thus have a wide variety of resonant frequencies.

There is therefore a need to provide a system making it possible to improve the acoustic insulation properties of a glazing over a greater frequency range, which can be integrated into a very wide variety of double glazings having different compositions without having to be modified or adapted according to the composition of the glazing.

SUMMARY OF THE INVENTION

The invention firstly relates to glazing comprising at least two glazed panels, which form a cavity between them, and at least one stack of resonators (3) positioned in the cavity, wherein the at least one stack of resonators comprises at least two resonators of different length, said resonators of the at least one stack having a longitudinal axis and being stacked along a stacking axis perpendicular to their longitudinal axis.

In certain embodiments, the at least one stack of resonators comprises at least three resonators of different length stacked along a stacking axis perpendicular to their longitudinal axis.

In certain embodiments, the at least one stack is positioned in a peripheral zone of the cavity.

In certain embodiments, the glazing comprises a spacer device, preferably positioned in a peripheral zone of the cavity, the at least one stack of resonators being located on the spacer device and/or inside the spacer device.

In certain embodiments, at least one of the resonators of the at least one stack is a closed-open tube or an open-open tube, preferably all the resonators of the stack are closed-open or open-open tubes.

In certain embodiments, the stack of resonators is formed by means of a stack of tubes stacked along a stacking axis perpendicular to their longitudinal axis, each tube comprising a transverse partition inside said tube defining two closed-open resonators on either side of the transverse partition.

In certain embodiments, at least one of the resonators of the at least one stack is configured to resonate at a frequency less than or equal to 400 Hz, preferably all the resonators of the stack are configured to resonate at a frequency less than or equal to 400 Hz.

In certain embodiments, the resonators are transparent or opaque.

In certain embodiments, at least one resonator, preferably all the resonators, comprise a polymer material, preferably chosen from polymethyl methacrylate, polyvinyl chloride, poly(ethylene terephthalate) and/or polyurethane, a ferrous or non-ferrous metal material, such as aluminum, or a combination thereof.

In certain embodiments, at least one of the resonators of the at least one stack comprises a porous absorbent material inside said resonator.

In certain embodiments, the glazing comprises at least two stacks of resonators stacked along a stacking axis perpendicular to their longitudinal axis, each of the stacks comprising at least two resonators of different length.

In certain embodiments, the glazing is a construction glazing, such as a glazing of a window or of a building facade, or an interior glazing.

The present invention makes it possible to meet the need expressed herein before. It more particularly provides a glazing having improved acoustic insulation, in particular in low frequencies but also in the medium and high frequencies, while being able to be relatively lightweight and compact. Furthermore, the solution used in the invention can be implemented in a wide diversity of glazings without needing to be specifically adapted to the glazing wherein it is integrated.

This is accomplished by virtue of the presence, in the cavity of the glazing, of a stack of resonators comprising at least two resonators of different length. These resonators, having a different length, will have a different resonant frequency. The resonators make it possible to absorb at least some of the sound energy in the cavity formed by the two glazed panels, which makes it possible to reduce the transmission of sound through the glazing. In particular, the resonators absorb the sound energy significantly for frequencies close to their resonant frequency. Thus, the presence of a plurality of resonators having different resonant frequencies allows an absorption of the sound energy over a more extensive frequency range, improving the acoustic performance of the glazing. In addition, the energy absorption also for the harmonic frequencies of the resonators as well as physical phenomena related to the modification of the properties of the gas cavity, due to the presence of the resonators, make it possible to also improve acoustic insulation at frequencies higher than the resonance frequencies of the resonators. Consequently, the presence of a stack of resonators of different lengths makes it possible to improve the acoustic insulation of the glazing regardless of its composition, and in particular regardless of its mass/spring/mass frequency.

Furthermore, the stack of resonators which are stacked along a stacking axis perpendicular to their longitudinal axis makes it possible to limit the surface area of the glazing occupied by the resonators and to leave a large surface area for visibility (daylight).

BRIEF DESCRIPTION OF THE FIGURES

FIG. 1 represents a schematic view of an example of stacks of resonators according to the invention as described in the example below.

FIG. 2 represents the sound reduction index R (on the y-axis, in dB) of an example glazing according to the invention as described in the example below (gray curve) and of a comparative glazing as described in the example below (black curve), as a function of sound frequency (on the x-axis, in Hz).

DETAILED DESCRIPTION

Figure 3:
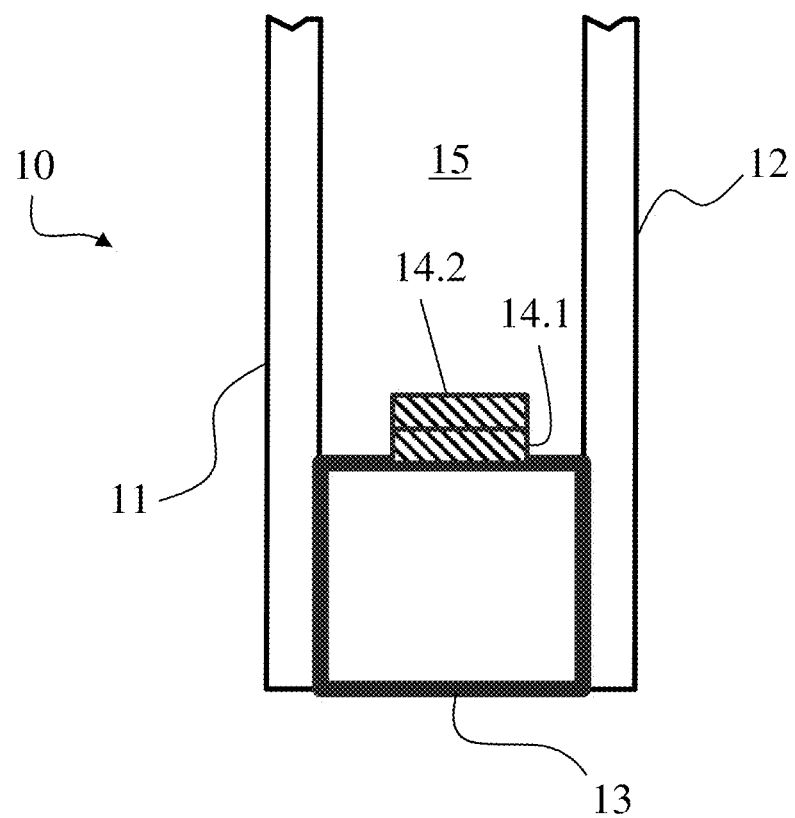
FIG. 3 schematically represents a cross-section of a glazing comprising two glazed panels that form a cavity therebetween for positioning a stack of resonators according to an embodiment.

The invention is disclosed below in greater detail and in a non-limiting manner in the following disclosure.

The invention relates to a glazing comprising at least two glazed panels. Advantageously, the glazed panels are parallel or substantially parallel to one another.

In certain embodiments, the glazing according to the invention may comprise exactly two glazed panels (it is then called a "double glazing"), or exactly three glazed panels (it is then called a "triple glazing"), or at least three glazed panels.

According to the present invention, a "glazed panel" refers to any structure comprising (or consisting of) at least one glass sheet or a glazed assembly. "Glazed assembly" is understood to mean a multilayer glazed element of which at least one layer is a glass sheet. Thus, the glazed panels may for example independently comprise a single glass sheet or alternatively a glazed assembly, for example one made of a laminated glazing (as described in more detail below).

The glass sheet can be made of organic or mineral glass. It can be made of tempered glass.

The glazed panels (or one of the glazed panels) may comprise (or consist of) a glazed assembly comprising at least one glass sheet which may be as described above. The glazed assembly is preferably a laminated glazing. The term "laminated glazing" is understood to mean at least two glass sheets between which at least one interlayer film generally made of viscoelastic plastic material is inserted. The interlayer film made of viscoelastic plastic material may comprise one or more layers of a viscoelastic polymer such as polyvinyl butyral (PVB) or an ethylene vinyl acetate copolymer (EVA) preferably PVB. The interlayer film can be made of standard PVB or of acoustic PVB (such as single-layer or tri-layer acoustic PVB). Acoustic PVB generally consists of three layers: two outer layers of standard PVB and an inner layer of PVB with added plasticizer so as to make it less rigid than the outer layers. The use of glazed panels comprising a laminated glazing makes it possible to improve the acoustic insulation of the glazing, the acoustic insulation being further increased when the interlayer film is made of acoustic PVB.

Each glazed panel comprises two main faces opposite one another corresponding to the faces of the glazed panel having the largest surface areas. Advantageously, the glazed panels independently have a thickness (between their two main faces) greater than or equal to 1.6 mm, for example a thickness of 1.6 to 24 mm, preferably of 2 to 12 mm, more preferably of 4 to 10 mm, for example 4 or 6 mm. The glazed panels of the glazing according to the invention may all have the same thickness or have different thicknesses. The greater the thickness and/or the higher the density of the glazed panels, the greater the acoustic insulation. Furthermore, the thicker the glazed panels, the lower the mass/spring/mass of the glazing.

Preferably, all the glazed panels of the glazing have identical height and width. The glazing according to the invention may have any possible form, and preferably has a quadrilateral shape, in particular a rectangular or substantially rectangular shape. Alternatively, the glazing may have a circular, or substantially circular, shape, or an elliptical, or substantially elliptical shape, or a trapezoidal or substantially trapezoidal shape.

The glazed panels define a cavity between them. Within the meaning of the present invention, the cavity is defined as being the volume between two glazed panels. Each of the glazed panels defining the cavity comprises an inner face corresponding to the main face of the glazed panel facing the cavity in question and an outer face corresponding to the second main face of the glazed panel, that is to say corresponding to the main face of the glazed panel opposite the face facing the cavity.

Preferably, the glazing comprises a spacer device, making it possible to set the length of the spacing between the glazed panels. The length of this spacing (i.e. the thickness of the cavity between the glazed panels) can be from 6 to 30 mm, preferably from 10 to 20 mm, for example 16 mm or 20 mm. Advantageously, the spacer device is positioned in the cavity, more particularly in a peripheral zone. It may for example be an interlayer in the form of a frame, in particular a frame composed of a single interlayer folded at the corners or composed of a plurality of (for example four) interlayer sections assembled together to form the frame. Preferably, the spacing device has a number of sides identical to the number of edges of the glazing, and more preferably a shape identical to that of the glazing. Preferably, each side of the spacer device is parallel to an edge of the glazing.

Preferably, the spacer device is made of metal material, such as aluminum and/or stainless steel, and/or polymer material, such as polyethylene, polycarbonate, polypropylene, polystyrene, polybutadiene, polyisobutylene, polyester, polyurethane, polymethyl methacrylate, polyacrylate, polyamide, polyethylene terephthalate, polybutylene terephthalate, acrylonitrile, butadiene styrene, acrylonitrile styrene acrylate, styrene-acrylonitrile copolymer, or a combination thereof, optionally reinforced with glass fibers.

Preferably, the glazed panels are secured to the spacer device. More preferably, the glazed panels are attached to the spacer by bonding, for example by a polyisobutylene (PIB)-based adhesive.

A seal can also be present, preferably arranged on the external face of the spacer device (i.e. the face of the spacer device closest to the edge of the glazed panels), more preferably the seal extends from this face to the edge of the glazed panels. This seal can be made with a mastic (called "sealant mastic") based on polyurethane, polysulfide and/or silicone.

In the glazing according to the invention, at least one stack of resonators is positioned in the cavity. The resonators of the at least one stack have a longitudinal axis and are stacked along a stacking axis perpendicular to their longitudinal axis. The at least one stack according to the invention comprises at least two resonators of different length.

The length of the resonator corresponds to its dimension along its longitudinal axis. When the resonators are of the tube type, the length of the resonator corresponds to the length of the tube or to the length of the portion of the tube which forms the resonator.

The resonators can be secured to one another by means of adhesive tape, preferably double-sided, glue (suitable for the resonant materials), and/or by welding. In certain embodiments, the resonant stack may be directly produced as one unitary piece, for example by an extrusion process.

The at least one stack of resonators may comprise exactly two resonators of different length or, preferably, more than two resonators of different length. For example, the at least one stack of resonators may comprise two or at least two resonators of different length, or three or at least three resonators of different length, or four or at least four resonators of different length, or five or at least five resonators of different length, or six or at least six resonators of different length, or eight or at least eight resonators of different length, or ten or at least ten resonators of different length. The higher the number of resonators of different length, the better the acoustic insulation. In an advantageous embodiment, the stack comprises three resonators of different length.

The at least one stack of resonators can comprise resonators having an identical length, provided that at least two resonators have a different length.

The resonators may be of any type. Preferably, at least one of the resonators of the at least one stack is chosen from the resonators of the closed-open tube type, with a circular section or with a rectangular or square section, the resonators of the open-open type, with a circular section or with a rectangular or square section, and the Helmholtz resonators, and more preferably is a resonator of the closed-open or open-open tube type (with a circular section or with a rectangular or square section). More preferably, the resonators may independently or all be resonators of the closed-open tube type, with a circular section or with a rectangular or square section, with open-open tube type resonators, with a circular section or with a rectangular or square section, Helmholtz resonators, or a combination of those. Preferably, the resonators are tube type resonators (with a circular section or with a rectangular or square section). Even more preferably, the resonators are closed-open tubes (with a circular section or with a rectangular or square section, more preferably with a rectangular or square section).

Advantageously, the at least one stack of resonators is formed by means of a stack of tubes (preferably of circular section or of rectangular or square section, more preferably of rectangular or square section) each comprising a longitudinal axis, the tubes being stacked along a stacking axis perpendicular to their longitudinal axis, each of the tubes comprising a transverse partition (i.e. orthogonal to the longitudinal axis of the tube) inside said tube (i.e., at a position in the tube different from the ends of the tube, which are not closed). The partition defines two open-closed resonators on either side of the partition (the partition constituting the closed end of each of the two resonators). When all the tubes comprise a transverse partition forming two resonators on either side of the partition, the at least one stack of tubes then forms two stacks of resonators.

The transverse partition may be located in the tube at a position corresponding to half the length of the tube. The two resonators formed on either side of the partition then have an identical length. Alternatively, the transverse partition in the tube can be at a position other than in the middle of the tube. The transverse partitions of the stacked tubes may or may not be aligned with one another. Each tube may comprise a clean transverse partition, or the same partition can pass through all the tubes and form a transverse partition for each of the tubes.

The middles of the stacked tubes may or may not be aligned.

In the case of a closed-open resonator, the relationship between its resonance frequency fr and its length L is given by the formula:

$$fr = \frac{C}{4L} \qquad [\text{Math. 1}]$$

wherein C is the speed of the air in m/s, and L is the length of the resonator in m. When the resonator is formed by a tube comprising a transverse partition in its middle, L is half of the total length of the tube. The sizing of the resonators can be chosen according to the frequency at which they are desired to resonate.

Particularly advantageously, at least one of the resonators of the at least one stack is configured to resonate at a frequency less than or equal to 400 Hz. More advantageously, all the resonators of the at least one stack are configured to resonate at a frequency less than or equal to 400 Hz. In embodiments of the invention, at least one of the resonators of the at least one stack can be configured to resonate at a frequency less than or equal to 350 Hz, or less than or equal to 325 Hz, or less than or equal to 300 Hz, or less than or equal to 275 Hz, or less than or equal to 250 Hz, or less than or equal to 225 Hz, or less than or equal to 200 Hz, or less than or equal to 175 Hz, or less than or equal to 150 Hz. Even more preferably, each resonator of the at least one stack can independently have a resonance frequency in the ranges mentioned above. In certain embodiments, all the resonators the at least one stack have their resonant frequency in a range mentioned above.

At least one of the resonators may be configured to resonate at the mass/spring/mass frequency of the glazing. The presence in the glazing according to the invention of resonators configured to resonate at a frequency close to the mass/spring/mass frequency of the glazing makes it possible to increase the loss of transmission of sound at the frequencies close to the mass/spring/mass frequency of the glazing but also to the frequencies higher than the mass/spring/mass frequency.

The mass/spring/mass frequency $f_{msm}$ of the glazing may be determined by the following formula:

$$f_{msm} = \frac{1}{2\pi}\sqrt{\frac{\rho_0 c_0^2}{d}\left(\frac{m_{s1}+m_{s2}}{m_{s1}m_{s2}}\right)} \qquad [\text{Math. 2}]$$

wherein $\rho_0$ is the density of the air in kg/m³, $c_0$ is the speed of sound in the air cavity in m/s, d is the thickness of the air cavity between the two glazed panels in m and $m_{s1}$ and $m_{s2}$ are respectively the masses per surface area unit of the first and second glazed panel in kg/m².

However, preferably, in the present invention, the resonators are not specifically sized as a function of the glazing wherein they are placed, to resonate at the mass/spring/mass frequency of the glazing. Indeed, in the invention, the at least one stack comprising resonators that resonate at different frequencies, preferably in the low frequencies, allows sound energy absorption over a wide range of frequencies that can include the mass/spring/mass frequency of a wide variety of glazings of various compositions.

The resonators may have a maximum diameter or a maximum thickness (in the direction of the thickness of the cavity) equal to the thickness of the cavity, or less than the thickness of the cavity.

The resonators may be (independently or all) transparent or opaque.

The resonators may comprise one or more of a polymer material, such as polymethyl methacrylate, polyvinyl chloride (PVC), polyethylene terephthalate (PET) and/or polyurethane, made of a metal, ferrous or non-ferrous material, for example aluminum, or a combination thereof. Advantageously, the material(s) of the resonators and their sizing are chosen so as to limit their mass and therefore the increase in the total mass of the glazing.

A porous absorbent material, preferably a porous textile, mineral wool and/or polymeric foam, may be arranged inside one or more resonators (or all the resonators). This can make it possible to improve the acoustic performance of the resonator. Preferably, "porous absorbent material" means a material characterized by a porosity greater than or equal to 0.7 and/or an airflow resistivity between 5,000 and 150,000 N·s·m$^{-4}$. The porosity of the material can be measured using a porometer according to the fluid saturation method, by mercury intrusion. Airflow resistivity can be measured according to the standard NF EN ISO 9053-1. The porous textile may be a textile made of cotton, linseed, hemp, coconut, polyester, cellulose, or a combination thereof. The mineral wool may be selected from the group consisting of glass wool, rock wool and combinations thereof. The polymeric foam may be selected from the group consisting of melanin foams, polyurethane foams, polyethylene foams, and combinations thereof.

Advantageously, the length of the resonators is less than the dimension of the glazing or of the cavity in the same direction as the length of the resonator. At least one resonator (or each resonator independently, or all the resonators of the stack) can have a length equal to 1 to 99% of the dimension of the cavity in the same direction as the length of the resonator. In certain embodiments, the length of at least one resonator (or each resonator independently, or of all the resonators of the stack) can be from 1 to 5%, or from 5 to 10%, or from 10 to 15%, or from 15 to 20%, or from 20 to 25%, or from 25 to 30%, or from 30 to 35%, or from 35 to 40%, or from 40 to 45%, or from 45 to 50%, or from 50 to 55%, or from 55 to 60%, or from 60 to 65%, or from 65 to 70%, or from 70 to 75%, or from 75 to 80%, or from 80 to 85%, or from 85 to 90%, or from 90 to 95%, or from 95 to 99%, of the length of the size of the cavity in the same direction as the length of the resonator.

Unless otherwise indicated, all the characteristics of the resonators described above can be applied to at least one resonator of the stack or of the cavity (i.e. one or more of the resonators of the stack or of the cavity), or to each resonator of the stack or of the cavity independently, or to all the resonators of the stack or of the cavity.

The at least one stack of resonators is preferably located in a peripheral zone of the cavity. By "peripheral zone of the cavity" means an area of the cavity adjacent to the edges of the glazed panels and preferably whose width (i.e., in a direction orthogonal to the edge of the glazed panels, in the plane of the glazed panels) is less than or equal to 20 cm, more preferably less than or equal to 10 cm, more preferably less than or equal to 5 cm. Particularly advantageously, the at least one stack of resonators is positioned on the spacer device, on the internal face of the spacer device, that is to say on its face which faces the cavity of the glazing. In other words, the resonators are stacked on the spacer device. The stack can be fixed to the spacing device by means of adhesive tape, preferably double-sided, glue (adapted and compatible with the materials of the resonator and of the spacer device), clips and/or clips. Alternatively, or additionally, the stack of resonators may be present inside the spacer device. In this latter embodiment, the open ends of the resonators are in fluid communication with the inside of the cavity (i.e. the gas of the cavity can circulate to the inside of the resonator), for example by means of orifices present in the internal face of the spacer device.

The glazing may comprise a plurality of stacks of resonators in which the resonators are stacked along a stacking axis perpendicular to their longitudinal axis and comprising at least two resonators of different length, for example two or at least two stacks of resonators, or three or at least three stacks of resonators, or four or at least four stacks of resonators, or five or at least five stacks of resonators, or six or at least six stacks of resonators, or seven or at least seven stacks of resonators, or eight or at least eight stacks of resonators, In certain embodiments, the glazing comprises as many stacks of resonators as described above that it has edges or the glazing comprises a number of stacks corresponding to a multiple (for example 2) of the number of edges of the glazing.

When the glazing comprises a plurality of stacks of resonators in its cavity, they may all be identical or different. They can independently be as described above. In particular, they can all be positioned in a peripheral zone of the cavity. They can all be arranged on the spacer device and/or inside the spacer device. Particularly advantageously, the glazing comprises, in its cavity, one or at least one stack of resonators as described above in a peripheral zone adjacent to each edge of the cavity, even more preferably the glazing comprises in its cavity two or at least two stacks of resonators as described above in a peripheral zone adjacent to each edge of the cavity. Preferably, the resonators of the stacks are parallel to the edge of the cavity to which the peripheral zone in which said stacks are located is adjacent. More preferably, the glazing comprises, in its cavity, one or at least one stack as described above positioned on the inner face on each side of the spacer device and/or inside each side of the spacer device, even more preferably the glazing comprises in its cavity two or at least two stacks as described above positioned on the inner face on either side of the spacer device and/or inside each side of the spacer device. For example, for a glazing of rectangular or square shape, the spacer device is preferably a frame of respectively rectangular or square shape, and one or two stacks of resonators as described above are arranged on the inner face of each of the four sides (or portions) of the frame and/or inside each of the four sides (or portions) of the frame.

Preferably, the cavity further comprises a gas. In certain embodiments, the cavity may consist of the resonators and the gas (and optionally the spacer device and/or the seal). The gas may be air and/or argon, and/or krypton and/or xenon. The use of argon, krypton or xenon, in addition to or as a replacement for air, improves the thermal insulation of the glazing.

The glazing according to the invention can be totally opaque, totally transparent, or partially opaque and partially transparent. Preferably, the glazing is at least partially transparent.

One (or more) of the glazed panels can be tinted in the thickness over a part of its surface, for example on the part of its surface defining a part of the cavity comprising the stacks of resonators. One (or more) of the glazed panels may be partly covered with an opaque coating, for example a paint and/or an enamel. The opaque coating may be present on the inner face of the glazed panel, or on its upper face, or on both faces, preferably it coats the inner face of the glazed panel. More preferably, only one of the glazed panels of the glazing is covered with an opaque coating. This glazed panel is advantageously the glazed panel intended to be the outermost glazed panel of the glazing when the latter is used in a building facade or window.

In particular, at least one part, preferably all, of the part of the cavity comprising the stacks of resonators is hidden by the application of an opaque coating (for example an enamel and/or a paint) on at least one of the glazed panels. Thus, advantageously, at least one of the glazed panels is coated with an opaque coating (for example, an enamel and/or a paint) on a surface comprising at least the surface on which the resonators extend into the cavity.

In certain embodiments, the glazed panels of the glazing, or at least one of the glazed panels, may have undergone a treatment in order to improve the thermal insulation of the glazing. In particular, the glazed panel(s) may comprise one (or more) insulating layer(s) such as an insulating layer based on metal and/or metal oxide, on one or more of their main faces, preferably on the inner face. When the glazed panel is also covered with an opaque coating (such as an enamel and/or a paint), an insulating layer compatible with the opaque coating is preferably used. Alternatively, the insulating layer and the opaque coating can be arranged on different faces of the glazed panel (for example, the insulating layer may be on the inner face and the opaque coating on the outer face). Again alternatively, when at least one of the glazed panels is a glazed assembly, the insulating layer can be interposed in the glazed assembly, for example between a PVB layer and a glass sheet.

In certain embodiments, for example, as an alternative to the use of an opaque coating hiding the portion of the cavity comprising the resonators, resonators having different colors and/or a different geometry can be used, for example to form patterns, to improve the aesthetics of the glazing.

In advantageous embodiments, the glazing according to the invention may exhibit acoustic insulation (determined for example by measuring the acoustic weakening index, in particular according to the ISO 10140 standard) higher than an identical glazing but not comprising any resonator in the cavity, over a frequency range from 100 Hz to 5000 Hz, preferably from 50 Hz to 20,000 Hz.

The glazing according to the invention can be used in any application that uses glazing. In particular, the glazing according to the invention can be a building glazing. The glazing can be intended to serve as an interface between the outside and the inside of the building and can be for example a facade glazing or window glazing. Alternatively, the glazing can be intended to be placed inside the building.

The invention likewise relates to a method for manufacturing a glazing as disclosed herein before, comprising:
providing at least two glazed panels;
arranging the two glazed panels so as to form a cavity between them;
introducing into the cavity at least one stack of resonators stacked along a stacking axis perpendicular to their longitudinal axis, said at least one stack comprising at least two resonators of different length, said at least one stack preferably being arranged on or in a spacer device;
optionally, securing the two glazed panels to the spacer device.

The manufacturing method may also comprise a step of depositing an opaque coating, such as an enamel and/or a paint, on at least one of the glazed panels, preferably on the inner face of one of the glazed panels. This step is advantageously carried out before the step of arranging the two glazed panels so as to form a cavity between them.

EXAMPLE

The following example shows the invention in a non-limiting manner.

A glazing 10 according to the invention has been manufactured. FIG. 3 shows a schematic cross-section of the glazing 10. This glazing 10 comprises two rectangular glazed panels 11, 12 of non-laminated non-tempered monolithic glass, each having the following dimensions: 1480 mm long, 1230 mm wide and 4 mm thick. The two glazed panels are secured to a spacing interlayer or spacer 13, so as to form between them a cavity 15 that is 20 mm thick. The interlayer or spacer 13 is an aluminum rectangular frame positioned along the edges of the glazed panels. On the inner face (i.e., the face turned toward the cavity) of each of the four portions (or sides) of the interlayer, a set of two stacks each comprising three resonators of three different lengths as shown in FIG. 1 has been secured. FIG. 3 schematically represents the 2 stacks 14.1, 14.2 of resonators provided on the interlayer or spacer 13 at a peripheral zone of the cavity 15. The four sets of two stacks of resonators on the four sides of the interlayer are all identical and are composed of a stack of three tubes 1 made of aluminum thick 0.5 mm, of rectangular section (of dimensions 19.5 mm×6 mm) and having a length of 84 cm, 66 cm and 54 cm, respectively. The tubes 1 are stacked on the longest length and the longest tube is attached to the interlayer. Each of the tubes 1 of the stacks comprises a transverse partition 2 made of aluminum at mid-length of the tube 1 closing the tube and defining two identical closed-open resonators 3 on each side of the partition 2 (the partition 2 corresponding to the closed end of the two resonators 3). Two stacks of identical resonators are therefore formed by each stack of tubes, on either side of the plane defined by the partitions 2. The 84-cm tube 1 has a resonance frequency of approximately 200 Hz, the 66-cm tube 1 has a resonance frequency of approximately 250 Hz and the 54-cm tube 1 has a resonance frequency of approximately 315 Hz. The remainder of the cavity comprises air.

A comparative double glazing of the 4(20)4 type has also been manufactured. This comparative glazing differs from the glazing according to the invention only in that it comprises no resonator, the entirety of the cavity being filled with air.

The spectrum of the sound reduction index (R) (or loss of sound transmission) of the two glazings was measured as a function of frequency, per the measurement protocol defined by the ISO 10140 standard.

The results are shown in FIG. 2.

It can be seen that, relative to the comparative glazing, the presence of the stacks of resonators allows a significant improvement in the acoustic performances of the glazing, in particular for the frequencies close to the mass/spring/mass frequency of the glazing, but also for frequencies higher than the mass/spring/mass frequency of the glazing. Thus, an increase in the sound reduction index $R_{A,tr}$ is observed, determined according to the ISO 717-1 standard, of up to 3 decibels for the glazing comprising the stack of resonators relative to the comparative glazing.

The invention claimed is:

1. A glazing comprising at least two glazed panels, which form a cavity between them, and at least one stack of resonators positioned in the cavity, wherein the at least one stack of resonators comprises at least two resonators of different length, said at least two resonators of the at least one stack having a longitudinal axis and being stacked along a stacking axis perpendicular to their longitudinal axis, wherein the at least one stack of resonators is formed by means of a stack of tubes stacked along a stacking axis perpendicular to their longitudinal axis, each tube comprising a transverse partition inside said tube defining two closed-open resonators on either side of the transverse partition.

2. The glazing according to claim 1, wherein the at least one stack of resonators comprises at least three resonators of different length stacked along the stacking axis perpendicular to their longitudinal axis.

3. The glazing according to claim 1, wherein the at least one stack is positioned in a peripheral zone of the cavity.

4. The glazing according to claim 1, comprising a spacer device, the at least one stack of resonators being located on the spacer device and/or inside the spacer device.

5. The glazing according to claim 4, wherein the spacer device is positioned in a peripheral zone of the cavity.

6. The glazing according to claim 1, wherein at least one of the resonators of the at least one stack is configured to resonate at a frequency less than or equal to 400 Hz.

7. The glazing according to claim 6, wherein all the resonators of the at least one stack are configured to resonate at a frequency less than or equal to 400 Hz.

8. The glazing according to claim 1, wherein the resonators are transparent or opaque.

9. The glazing according to claim 1, wherein at least one resonator comprises a polymer material, a ferrous or non-ferrous metal material or a combination thereof.

10. The glazing according to claim 9, wherein all the resonators comprise a polymer material, a ferrous or non-ferrous metal material or a combination thereof.

11. The glazing according to claim 9, wherein the polymer material is chosen from polymethyl methacrylate, polyvinyl chloride, poly(ethylene terephthalate) and/or polyurethane, and the non-ferrous metal material is aluminum.

12. The glazing according to claim 1, wherein at least one of the resonators of the at least one stack comprises a porous absorbent material inside said resonator.

13. The glazing according to claim 1, comprising at least two stacks of resonators stacked along the stacking axis perpendicular to their longitudinal axis, each of the at least two stacks comprising at least two resonators of different length.

14. The glazing according to claim 1, wherein the glazing is a construction glazing or an interior glazing.

15. The glazing according to claim 14, wherein the construction glazing is a facade glazing or window glazing.

* * * * *